(12) United States Patent
Kanda

(10) Patent No.: US 6,687,589 B2
(45) Date of Patent: Feb. 3, 2004

(54) ELECTRIC POWER STEERING DEVICE

(75) Inventor: Koji Kanda, Kyoto (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 10/356,516

(22) Filed: Feb. 3, 2003

(65) Prior Publication Data

US 2003/0146041 A1 Aug. 7, 2003

(30) Foreign Application Priority Data

Feb. 4, 2002 (JP) ........................................ 2002-026872

(51) Int. Cl.[7] ................................................. G06F 7/00
(52) U.S. Cl. ........................... 701/41; 701/42; 180/410; 180/446
(58) Field of Search .............................. 701/41, 42, 36; 180/410, 443, 446

(56) References Cited

U.S. PATENT DOCUMENTS

| | | | | |
|---|---|---|---|---|
| 6,102,151 A | * | 8/2000 | Shimizu et al. | 180/446 |
| 6,148,951 A | * | 11/2000 | Nishi et al. | 180/446 |
| 6,405,113 B1 | * | 6/2002 | Yamawaki et al. | 701/41 |
| 6,427,104 B1 | * | 7/2002 | Matsushita et al. | 701/42 |
| 6,470,994 B1 | * | 10/2002 | Shimizu et al. | 180/446 |
| 6,523,637 B1 | * | 2/2003 | Nakano et al. | 180/446 |

FOREIGN PATENT DOCUMENTS

JP  3176269  7/1991

* cited by examiner

*Primary Examiner*—Richard M. Camby
(74) *Attorney, Agent, or Firm*—McGinn & Gibb, PLLC

(57) ABSTRACT

A reduction gear ratio n of a reduction gear is multiplied by a steering angular speed by a multiplier, and the deviation e achieved by subtracting a motor rotational speed from the multiplication value is integrated and then multiplied by an integration gain to achieve a current target value. The current target value is added with the multiplication value of the deviation e and a proportional gain in a phase compensator to perform phase compensation. The phase-compensation result is added with the value achieved by differentiating the motor rotational speed and multiplying the differential value thus achieved by a control gain in an inertia compensator to perform inertia compensation. Further, the value achieved by multiplying the motor rotational speed by a control gain is subtracted from the inertia-compensation result in a damping controller to perform damping control, and a final current target value. It is achieved from an adder.

5 Claims, 4 Drawing Sheets

ELECTRIC POWER STEERING DEVICE

BACKGROUND OF THE INVENTION

The present invention relates to an electric power steering device for applying steering assist force to a steering mechanism of a vehicle by an electric motor.

There has been hitherto used an electric power steering device in which an electric motor is driven in accordance with a steering torque applied to a handle (steering wheel) by a driver to thereby apply steering assist force to a steering mechanism. The electric power steering device is equipped with a torque sensor for detecting a steering torque applied to a handle serving as an operating member for steering, and a target value of current to flow into the electric motor is set on the basis of the steering torque detected by the torque sensor. An instruction value to be applied to the driving unit of the electric motor is generated on the basis of the deviation between the target value and the detected value of current actually flowing into the electric motor. The driving unit of the electric motor comprises a PWM signal generating circuit for generating a pulse width modulation signal (PWM signal) having the duty ratio corresponding to the instruction value, and a motor driving circuit constructed by using a power transistor which is turned on/off in accordance with the duty ratio of the PWM signal, and applies the voltage corresponding to the duty ratio, that is, the voltage corresponding to the instruction value to the electric motor. Upon application of the voltage described above, the current flowing through the electric motor is detected by a current detecting circuit, and the difference between the detection value and the target value is used as the deviation for generating the instruction value. In the electric power steering device, feedback control is performed so that the current of the target value set on the basis of the steering torque flows into the electric motor.

Such a conventional electric power steering device as described above uses a torque sensor as an indispensable constituent element to set the current target value. However, the torque sensor is expensive, and thus it induces a problem that the cost of the whole conventional electric power steering device is increased.

SUMMARY OF THE INVENTION

Therefore, an object of the present invention is to provide an electric power steering device for setting a target value of current to flow into an electric motor without using any expensive torque sensor.

A first invention is an electric power steering device for applying steering assist force to a steering mechianism of a vehicle though a reducer by driving an electric motor in response to an operating amount applied by an operating member for vehicle steering, the electric power steering device comprising:

- a steering angular-speed detector for detecting steering angular speed corresponding to rate of steering-angle variation caused by the operation of the operating member;
- a rotational speed detector for detecting rotational speed corresponding to rate of rotational angle variation of the electric motor;
- a target value setting unit for setting a current target value to be supplied to the electric motor;
- a current detector for detecting current flowing in the electric motor and outputting the detected current value;
- a controller for generating an instruction value for feedback control to the driving of the electric motor on the basis of current deviation between the current target value and the current detection value; and
- a driving unit for driving the electric motor in accordance with the instruction value, wherein the target value setting unit includes,

- a deviation calculator for calculating angular speed deviation based on the rotational speed, reduction ratio of the reducer and the steering angular speed, and
- a target value calculator for calculating the target value of current by multiplying integration value corresponding to the operating amount, obtained by integrating the angular speed deviation, by a predetermined integration gain.

The angular speed deviation may be obtained by dividing value, which is obtained by multiplying the rotational speed by reduction ratio of the reducer, by the steering angular speed, or may be obtained by subtracting the rotational speed from value which is obtained by multiplying the steering angular speed by reduction ratio of the reducer.

According to the first invention described above, the value corresponding to the operating amount is calculated on the basis of a steering angular speed and a motor rotational speed by the target value setting unit. With this construction, even when there is not equipped any expensive torque sensor, the current target value corresponding to the steering torque can be set as in the case where an expensive torque sensor is equipped, so that increase in the cost of the whole power electric steering device can be suppressed.

A second invention is characterized in that the target value setting unit includes a compensation value calculator for calculating compensation value for phase compensation to the feedback control by multiplying the angular speed deviation by a predetermined proportional gain, and the target value calculator calculates the target current value by adding the compensation value to the value obtained by multiplying the integration value corresponding to the operating amount by the integration gain.

According to the second invention described above, the deviation between the steering angular speed and the motor rotational speed is multiplied by the proportional gain, and the multiplication result is added to the current target value, thereby performing the phase compensation to the feedback. With this construction, the phase compensation can be performed without using any expensive torque sensor. Therefore, increase in the cost of the whole electric power steering device can be suppressed, and also it is unnecessary to calculate a differential value for the steering torque for phase compensation, so that the phase compensation can be easily performed.

A third invention is characterized in that the electric power steering device according to claim 1 further includes a vehicle speed detector for detecting vehicle speed, wherein the target value calculator calculates the integration gain on the basis of the vehicle speed.

According to the third invention described above, steering assist can be suitably performed in consideration of parameters (for example, reaction of tire reaction, steering frequency range, etc.) varying in accordance with the vehicle speed.

DETAILED DESCRIPTION OF PREFERRED EMBODIMENTS

An embodiment according to the present invention will be described hereunder with reference to the accompanying drawings.

<1. Whole Construction>

Figure 1:
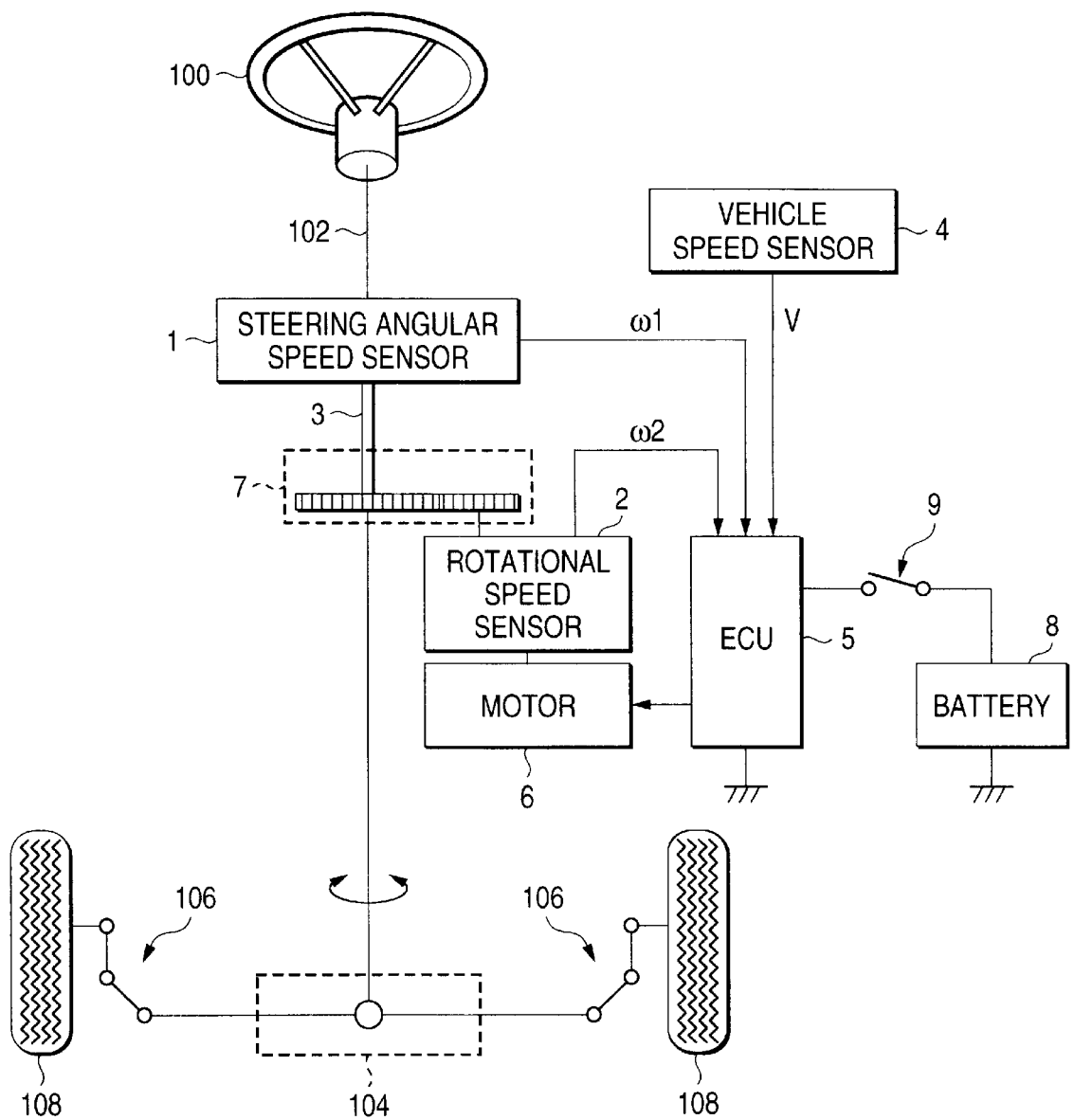
FIG. 1 is a schematic diagram showing the construction of an electric power steering device according to an embodiment of the present invention together with the construction of a vehicle associated with the electric power steering device.

FIG. 1 is a schematic diagram showing the construction of an electric power steering device according to an embodiment of the present invention together with the construction of a vehicle associated with the electric power steering device. The electric power steering device includes: a steering shaft 102 having one end fixed to a handle (steering wheel) 100 serving as an operating member for steering; a rack pinion mechanism 104 linked to the other end of the steering shaft 102; a steering angular speed sensor 1 for detecting the steering angular speed corresponding to a rotational speed of the handle 100; a torsion bar 3 which constitutes a part of the steering shaft 102 at some midpoint of the steering shaft 102 and transmits a steering torque applied by the operation of the handle 100 as a torsion torque; an electric motor 6 for generating steering assist force for reducing the load imposed on the driver due to the handle operation (steering operation); a rotational speed sensor 2 such as a tachometer or the like for detecting the rotational speed of the electric motor 6; a reduction gear 7 for transmitting the steering assist force from the electric motor 6 to the steering shaft 102; and an electric control unit (ECU) 5 which is supplied with power from an in-vehicle battery 8 through an ignition switch 9 and controls the driving of the motor 5 on the basis of the respective sensor signals from the steering angular speed sensor 1, the rotational speed sensor 2 and the vehicle speed sensor 4.

When the driver operates the handle 100 in the vehicle having such an electric power steering device mounted therein, the steering angular speed corresponding to the rate of the steering angle variation caused by the operation is detected by the steering angular speed sensor 1. The motor 6 is driven on the basis of the steering angular speed thus detected, the rotational speed corresponding to the rate of the rotational angle variation of the motor 6 and the vehicle speed detected by the vehicle speed sensor 4 by ECU 5. Accordingly, the motor 6 generates steering assist force, and the steering assist force thus generated is applied to the steering shaft 102 through the reduction gear 7, thereby reducing the load imposed on the driver by the steering operation. That is, the sum of the steering torque applied through the torsion bar 3 by the handle operation and torque based on the steering assist force generated by the motor 6 is given as an output torque through the steering shaft 102 to the rack pinion mechanism 104. When the pinion shaft is rotated by the output torque thus given, the rotation of the pinion shaft is converted to a reciprocal motion of the rack shaft by the rack pinion mechanism 104. Both the ends of the rack shaft is linked to wheels 108 through link members 106 each of which includes a tie rod and a steering knuckle arm, and the orientation of the wheels 108 is changed in accordance with the reciprocal motion of the rack shaft.

<2. Construction and Operation of Controller>

Figure 2:
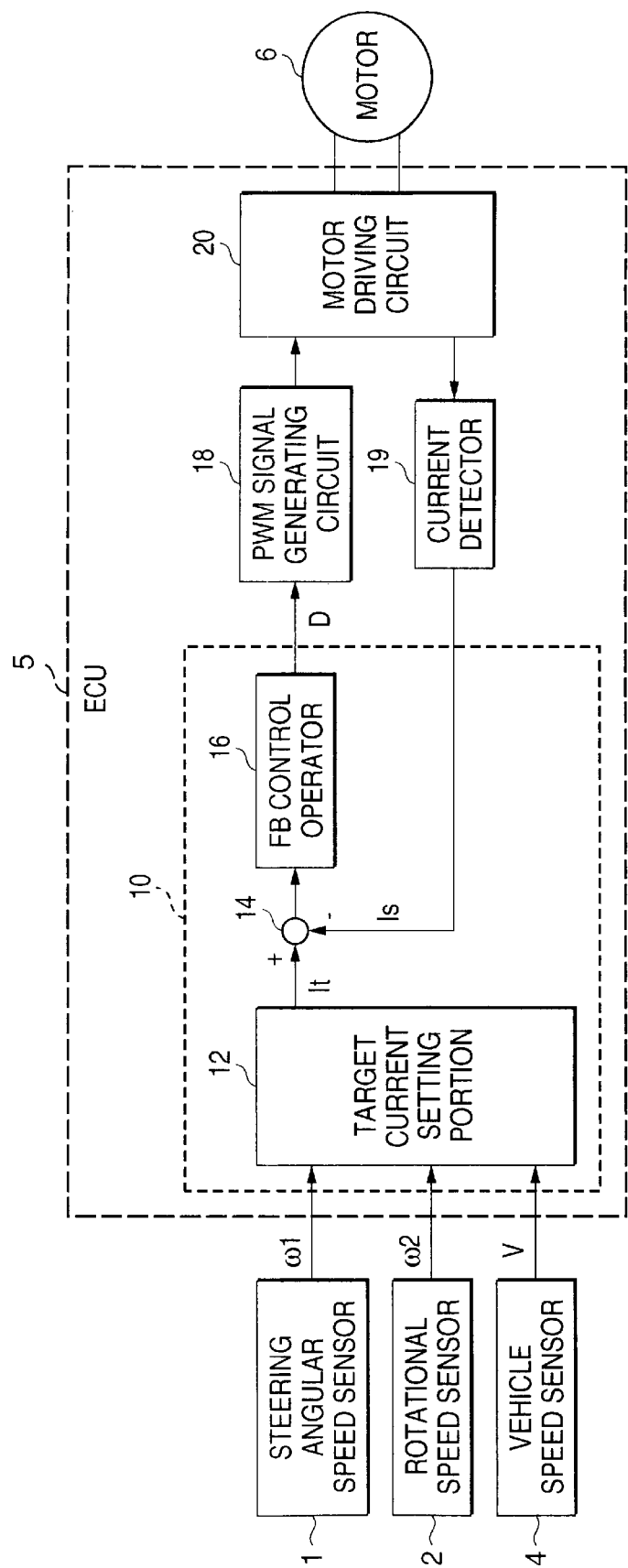
FIG. 2 is a block diagram showing the functional construction of ECU serving a controller for the electric power steering device according to the embodiment.

FIG. 2 is a block diagram showing the functional construction of ECU 5 serving as a controller for the electric power steering device. ECU 5 includes a microcomputer 10 functioning as a motor controller, a PWM signal generating circuit 18 for generating a pulse width modulation signal (PWM signal) having the duty ratio corresponding to an instruction value output from the microcomputer 10, a motor driving circuit 20 for applying the voltage corresponding to the duty ratio of the PWM signal to the motor 6, and a current detector 19 for detecting the current flowing in the motor 6.

The microcomputer 10 functions as the motor controller including a target current setting portion 12, a subtracter 14 and a feedback control operator (hereinafter abbreviated as "FB control operator") 16 by executing a predetermined program stored in the memory thereof. In the motor controller, the target current setting portion 12 determines a target value It of current to flow into the motor 6 on the basis of a detection value ω1 of the steering angular speed output from the steering angular speed sensor 1 (hereinafter merely referred to as "steering angular speed ω1"), a detection value ω2 of the rotational speed of the motor 6 output from the rotational speed sensor 2 (hereinafter rarely referred to as "rotational speed ω2") and a detection value V of the vehicle speed output from the vehicle speed sensor 4 (hereinafter merely referred to as "vehicle speed V"). The detailed construction and operation of the target current setting portion 12 will be described. The subtracter 14 calculates the deviation It-Is between the current target value It output from the target current setting portion 12 and the detection value Is of the motor current output from the current detector 19. On the basis of the deviation It-Is, the FB control operator 16 generates the instruction value D for feedback control to be applied to the PWM signal generating circuit 18.

The PWM signal generating circuit 18 generates a pulse signal having the duty ratio corresponding to the instruction value D, that is, a PWM signal whose pulse width varies in accordance with the instruction value D. The motor driving circuit 20 applies the voltage corresponding to the pulse width (duty ratio) of the PWM signal to the motor 6. The motor 6 generates a torque whose magnitude and direction correspond to the current flowing in the motor by the application of the voltage.

Figure 3:
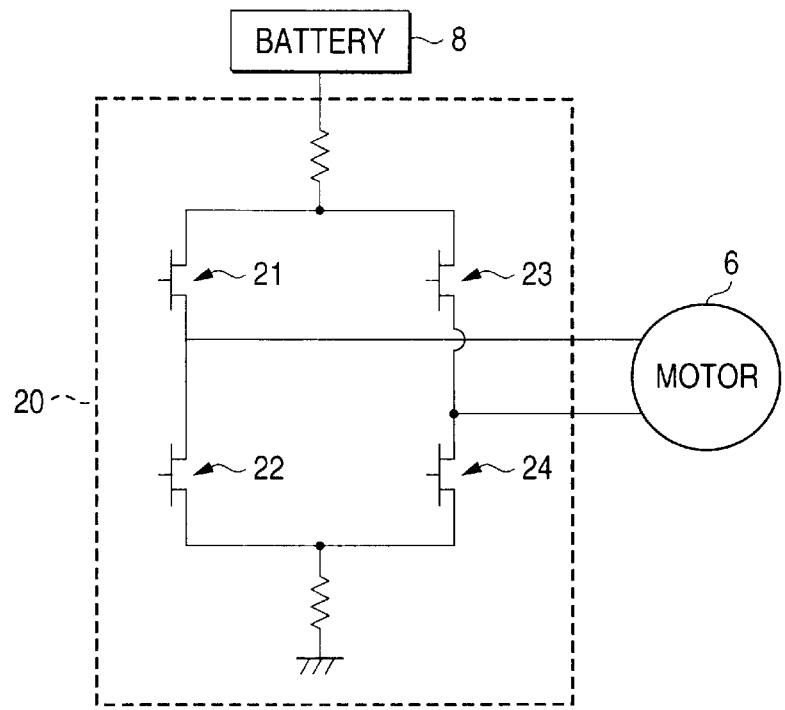
FIG. 3 is a circuit diagram showing an example of the construction of a motor driving circuit according to the embodiment.

FIG. 3 is a circuit diagram showing an example of the construction of the motor driving circuit 20. In this example, a bridge circuit is constructed by four field-effect transistors for power (hereinafter referred to as "FET") 21 to 24, and the bridge circuit is connected between the power line and the ground line of a battery 8. When a steering motion in the right direction is assisted, the PWM signal is input from the PWM signal generating circuit 18 to the gates of FETs 21, 24, and a signal for turning off the FETs 22, 23 is input to the gates of FETs 22, 23, whereby the voltage corresponding to the duty ratio of the PWM signal is applied to the motor 6 by the motor driving circuit 20 to produce a torque for assisting the steering motion in the right direction. On the other hand, when a steering motion in the left direction is assisted, the PWM signal is input from the PWM signal generating circuit 18 to the gates of the FETs 22, 23, and a signal for turning off the FETs 21, 24 is input to the gates of the FETs 21, 24, whereby the voltage corresponding to the duty ratio of the PWM signal is applied to the motor 6 in the opposite direction to the direction described above by the motor driving circuit 20 to produce a torque for assisting the steering motion in the left direction.

<3. Detailed Construction and Operation of Target Current Setting Portion>

Figure 4:
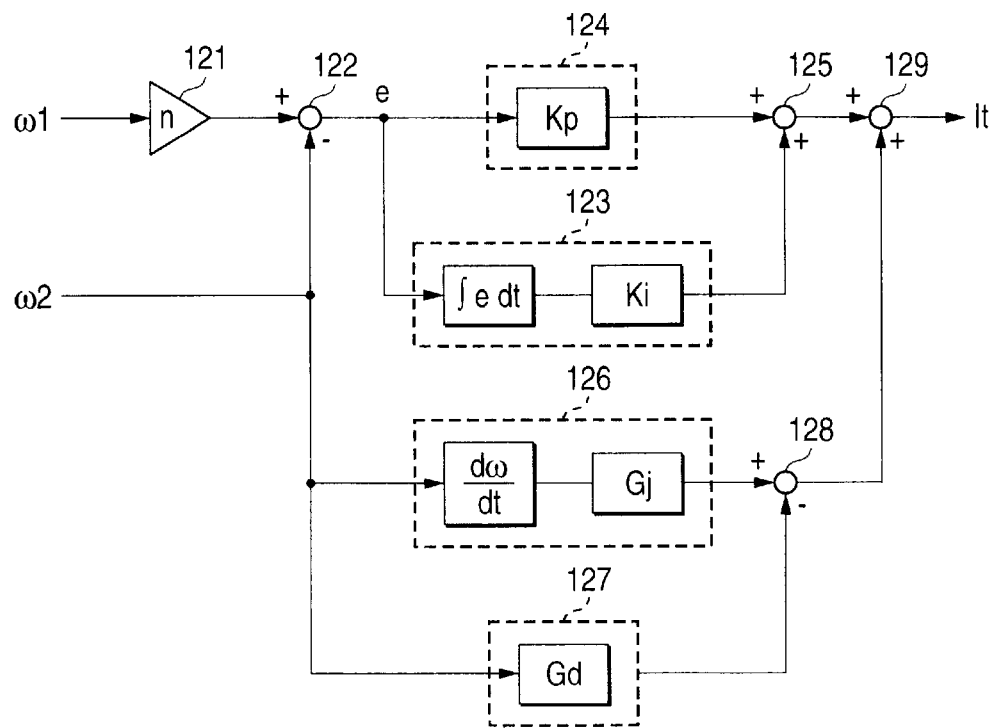
FIG. 4 is a block diagram showing the construction of a target current setting portion of the embodiment.

FIG. 4 is a block diagram showing the construction of the target current setting portion according to the embodiment. The target current setting portion 12 includes a multiplier 121 for multiplying the steering angular speed $\omega1$ by the reduction gear ratio n in the reduction gear 7 and outputting the multiplication result, a subtracter 122 for subtracting the rotational speed $\omega2$ from the output value of the multiplier 121 and outputting the subtraction result as a deviation e, a target value calculator 123 which is supplied with the deviation e and outputs the current target value, a phase compensating portion 124 which is supplied with the deviation e and outputs a phase compensation current value to the feedback control, an adder 125 for adding the phase compensation current value to the current target value output from the target value calculator 123, an inertia compensation portion 126 which is supplied with the rotational speed $\omega2$ of the motor 6 and outputs an inertia compensation current value to suppress the effect of the inertia moment of the motor 6, a damping controller 127 which is supplied with the rotational speed $\omega2$ of the motor 6 and outputs a damping current value for suppressing the rotation variation of the motor 6, a subtracter 128 for subtracting the damping current value from the inertia compensated current value, and an adder 129 for adding the output value of the subtracter 128 and the output of the adder 125 and outputting the final current target value. The reduction gear ratio n means the number of revolutions of the motor which is required for the steering shaft 102 to make one revolution.

The operation of the constituent elements will be described in detail. The target value calculator 123 performs the calculation of integrating the deviation e between the rotational speed $\omega2$ and the steering angular speed $\omega1$ multiplied by the reduction gear ratio n in the reduction gear 7, thereby achieving the deviation between the rotational angle of the motor 6 and the steering angle of the handle 100 which is multiplied by the reduction gear ratio n. Here, when the spring constant of the torsion bar 3 is represented by k and the angle difference corresponding to the torsion at both the end portions is represented by ($\theta1-\theta2$), the steering torque value Ts can be represented by the following equation (1):

$$Ts = K(\theta1 - \theta2) \tag{1}$$

Accordingly, the value corresponding to the steering torque value Ts can be calculated from the deviation corresponding to the torsion at both the end portions of the torsion bar 3, that is, the deviation between the steering angle of the handle 100 and the rotational speed of the motor 6.

Figure 5:
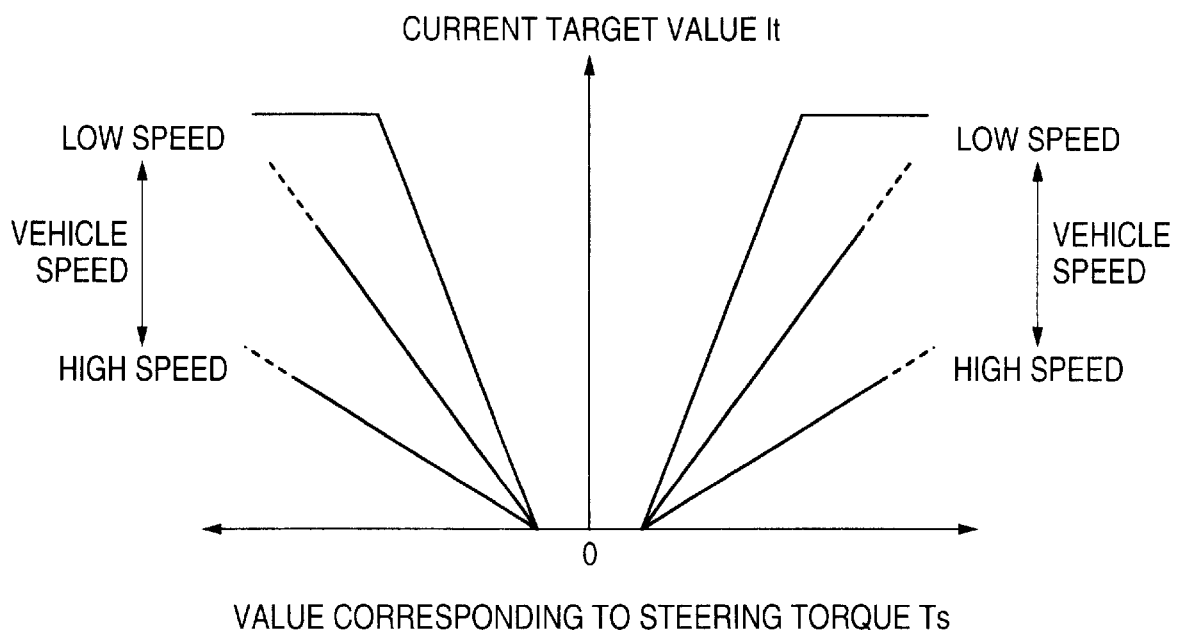
FIG. 5 is a diagram showing an assist table for setting a target value of current to be supplied to a motor in the embodiment.

Furthermore, the target value calculator 123 calculates the current target value by multiplying the value corresponding to the steering torque value Ts thus calculated by the integration gain Ki. The target value calculator 123 may hold a fixed constant as the integration gain Ki, however, it preferably calculates the integration gain Ki in connection with the vehicle speed V input from the vehicle speed sensor. For example, the integration gain Ki corresponding to the vehicle speed V may be calculated by referring to a table or predetermined equation indicating the relationship between the integration gain Ki and the vehicle speed. However, in this case, a table indicating the relationship between the current target value It to be supplied to the motor 6 to generate proper steering assist force and the value corresponding to the steering torque value Ts with the vehicle speed set as a parameter, that is, a table as shown in FIG. 5 (called as "assist table") is held in the target value calculator 123 in advance, and the target value calculator 123 refers to the assist table to set the current target value It. The assist table is constructed so as to contain the calculation result of the integration gain Ki achieved on the basis of the vehicle speed. If the table is set so that the current target value It is increased as the vehicle speed is reduced, that is, the steering torque value Ts is increased as shown in FIG. 5, the steering assist force is magnified as the handle is heavier and thus the steering operation can be more easily performed.

The phase compensator 124 carries out the operation of multiplying the deviation e by the proportional gain Kp to thereby achieve the phase compensation current value to the feedback control. The phase compensation is generally carried out to compensate the delay of the transfer characteristic in the control system and stabilize the control system. For example, the phase compensation is specifically carried out by adding the steering torque with the value corresponding to the differential value thereof so that as the frequency of the steering torque is increased, the phase advancement is increased. Accordingly, as described above, since the integration value of the deviation e corresponds to the steering torque value Ts, when the phase compensator 124 multiplies the deviation e corresponding to the differential value of the steering torque Ts by the proportional gain Kp, and the adder 125 adds the multiplication value thus achieved to the current target value, the phase compensation to the steering torque can be easily implemented. The phase compensator 124 may hold a fixed constant as the proportional gain Kp, and preferably the proportional gain Kp corresponding to the vehicle speed V input from the vehicle speed sensor 4 is calculated. Specifically, the proportional gain Kp corresponding to the vehicle speed V is calculated by referring to a table or predetermined table indicating the relationship between the proportional gain Kp and the vehicle speed V.

The inertia compensator 126 carries out the operation of multiplying the differential value of the rotational speed $\omega2$ of the motor 6 by the control gain Gj and outputs the inertia compensation current value. The damping controller 127 carries out the operation of multiplying the rotational speed $\omega2$ of the motor 6 by the control gain Gd and outputs the damping current value. The damping current value is subtracted from the inertia compensation current value by the subtracter 128, and the output value of the subtracter 128 is added to the current target value output from the adder 125 by the adder 129 to achieve the final current target value It. This construction implements the inertia control for suppressing the effect of the inertia moment of the motor 6 and the damping control for controlling the rotation variation of the motor 6. The control gain Gj and Gd may be set as a fixed constant, however, it is preferably calculated in accordance with the vehicle speed V input from the vehicle speed sensor 4. Specifically, like the proportional gain Kp, the control gain Gj and Gd corresponding to the vehicle speed V is calculated by referring to a predetermined table or predetermined equation.

<4. Effect>

According to the above embodiment, the value corresponding to the steering torque is calculated on the basis of the steering angular speed $\omega1$ output from the steering angular speed sensor 1 and the rotational speed $\omega2$ of the motor 6 output from the rotational speed sensor 2 by the target current setting portion 12. With this construction, even when no expensive torque sensor is equipped, the current target value corresponding to the steering torque can be set like the case where the expensive torque sensor is used. Therefore, increase of the cost of the whole electric power steering device can be suppressed.

Furthermore, according to the above embodiment, the deviation between the steering angular speed ω1 and the rotational speed ω2 is multiplied by the proportional gain Kp and the multiplication result is added to the current target value to perform the phase compensation to the feedback control. This construction enables the phase compensation to be performed without using any expensive torque sensor, and thus increase in the cost of the whole electric power steering device can be suppressed. In addition, it is unnecessary to calculate the differential value for the steering torque for phase compensation, so that the phase compensation can be easily performed.

Still furthermore, according to the above embodiment, the proportional gain Kp, the integration gain Ki and the control gain Gj, Gd which are used for the above control are set on the basis of the vehicle speed V output from the vehicle speed sensor 4. Accordingly, the proper steering assistance can be performed in consideration of the parameters varying the vehicle speed (for example, the reaction force of tires, the steering frequency range, etc.).

<5. Modification>

In the above embodiment, the torsion bar 3 is used as the transmitting member of the steering torque, and the value corresponding to the steering torque value Ts is calculated on the basis of the deviation corresponding to torsion at both the end portions of the torsion bar 3, that is, the deviation between the steering angle of the handle 100 and the rotational angle of the motor 6. However, the torque transmitting member is not limited to the torsion bar, and any type of torque transmitting member such as a coil spring or the like may be used insofar as the deviation between the steering angle of the handle 100 and the rotational angle of the motor 6 occurs in the torque transmitting member.

In the above embodiment, the steering angular speed ω1 output from the steering angular speed sensor 1 and the rotational speed ω2 of the motor 6 output from the rotational speed sensor 2 are input to the target current setting portion 12. However, the steering angular speed ω1 may be detected by newly equipping an angle sensor in place of the steering angular speed sensor 1 and calculating the time-differential value of the steering angle of the handle 100 achieved from the angle sensor. Likewise, the rotational speed ω2 may be detected by newly equipping an angle sensor in place of the rotational speed sensor and calculating the time-differential value of the rotational angle of the motor 6 achieved from the angle sensor.

In the above embodiment, the functions of the respective constituent elements of the target current setting portion 12 are executed in the software style by executing the predetermined program in the microcomputer 1. However, some or all functions of these constituent elements may be implemented in the hardware style by dedicated electronic circuits or the like. Furthermore, in the above embodiment, the proportional gain Kp, the integration gain Ki and the control gain Gj, Gd used for the above control are preferably set on the basis of the vehicle speed V output from the vehicle speed sensor 4. However, the present invention is not limited to the vehicle speed, and the above factors may be set on the basis of other running conditions of a vehicle.

Further, the angular speed deviation may be obtained by subtracting the steering angular speed by value obtained by multiplying the motor rotational speed from 1/n. By this calculation, the Same effect in the above embodiment can be applied.

What is claimed is:

1. An electric power steering device for applying steering assist force to a steering mechanism of a vehicle though a reducer by driving an electric motor in response to an operating amount applied by an operating member for vehicle steering, the electric power steering device comprising:

a steering angular-speed detector for detecting steering angular speed corresponding to rate of steering-angle variation caused by the operation of the operating member;

a rotational speed detector for detecting rotational speed corresponding to rate of rotational angle variation of the electric motor;

a target value setting unit for setting a current target value to be supplied to the electric motor;

a current detector for detecting current flowing in the electric motor and outputting the detected current value;

a controller for generating an instruction value for feedback control to the driving of the electric motor on the basis of current deviation between the current target value and the current detection value; and a driving unit for driving the electric motor in accordance with the instruction value, wherein the target value setting unit includes,
a deviation calculator for calculating angular speed deviation based on the rotational speed, reduction ratio of the reducer and the steering angular speed, and
a target value calculator for calculating the target value of current by multiplying integration value corresponding to the operating amount, obtained by integrating the angular speed deviation, by a predetermined integration gain.

2. The electric power steering device according to claim 1, wherein the target value setting unit includes a compensation value calculator for calculating compensation value for phase compensation to the feedback control by multiplying the angular speed deviation by a predetermined proportional gain, and the target value calculator calculates the target current value by adding the compensation value to the value obtained by multiplying the integration value corresponding to the operating amount by the integration gain.

3. The electric power steering device according to claim 1 further comprising:

a vehicle speed detector for detecting vehicle speed, wherein the target value calculator calculates the integration gain on the basis of the vehicle speed.

4. The electric power steering device according to claim 1, wherein the deviation calculator calculates the angular speed deviation by dividing value, which is obtained by multiplying the rotational speed by reduction ratio of the reducer, by the steering angular speed.

5. The electric power steering device according to claim 1, wherein the deviation calculator calculates the angular speed deviation by subtracting the rotational speed from value which is obtained by multiplying the steering angular speed by reduction ratio of the reducer.

* * * * *